(No Model.) 2 Sheets—Sheet 1.

T. H. SMITH.
COTTON CHOPPER.

No. 435,462. Patented Sept. 2, 1890.

Witnesses.
A. Ruppert,
H. A. Daniels

Inventor:
Thomas H. Smith
Per
Thomas R. Simpson
Atty.

(No Model.) T. H. SMITH. 2 Sheets—Sheet 2.
COTTON CHOPPER.
No. 435,462. Patented Sept. 2, 1890.

Witnesses.
A. Ruppert.
H. A. Daniels

Inventor.
Thomas H. Smith
Per
Thomas P. Simpson
Atty.

UNITED STATES PATENT OFFICE.

THOMAS H. SMITH, OF HONEY GROVE, TEXAS.

COTTON-CHOPPER.

SPECIFICATION forming part of Letters Patent No. 435,462, dated September 2, 1890.

Application filed January 21, 1890. Serial No. 337,578. (No model.)

*To all whom it may concern:*

Be it known that I, THOMAS H. SMITH, a citizen of the United States, residing at Honey Grove, in the county of Fannin and State of Texas, have invented certain new and useful Improvements in Cotton-Choppers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of my invention is to make a cotton-cultivator which will chop out the superfluous plants and at the same time work up the soil between the rows of plants, the implement being made to straddle the row and produce a fine tilth on both sides thereof.

Figure 1:
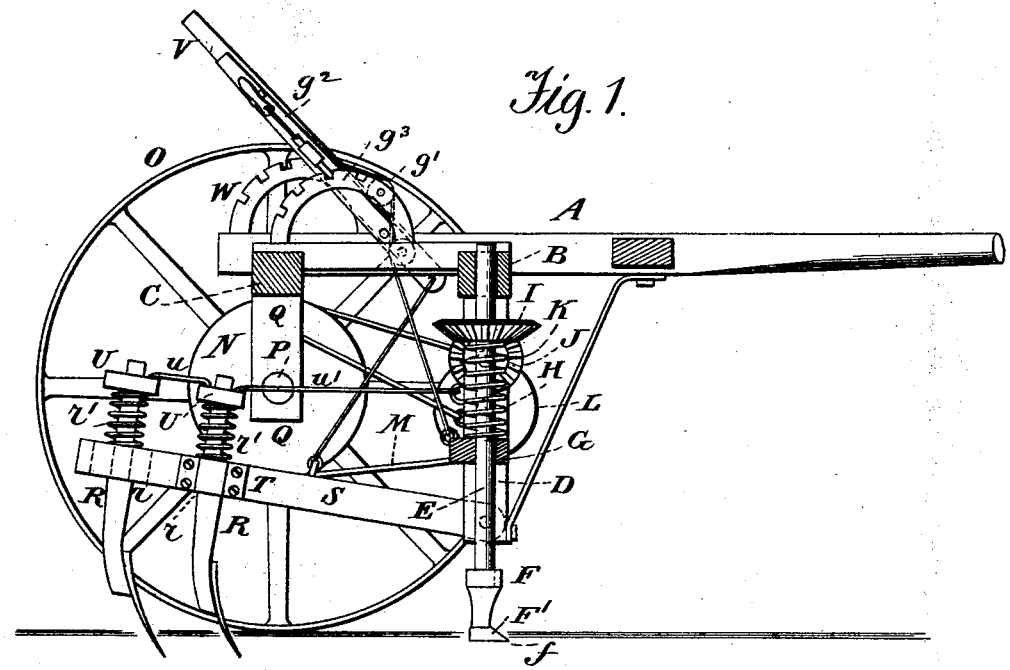
Figure 2:
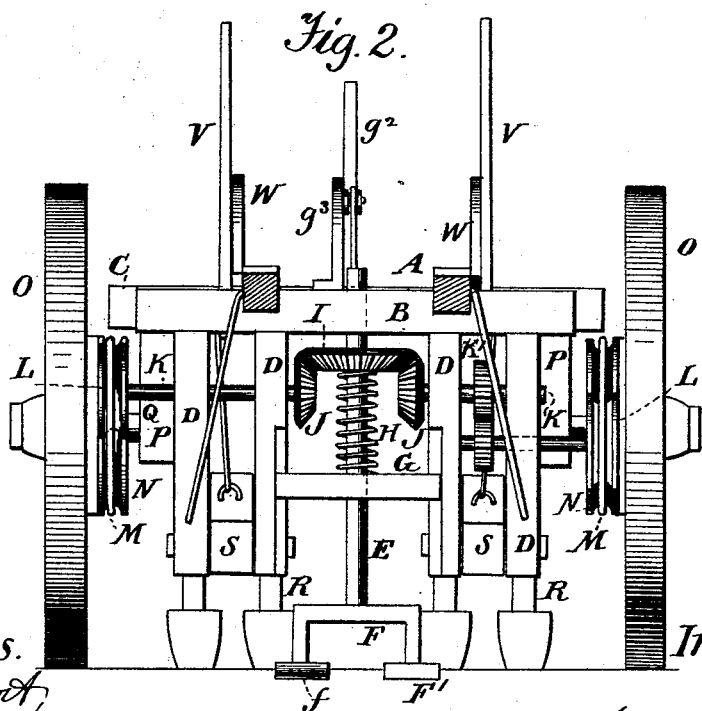
Figure 3:
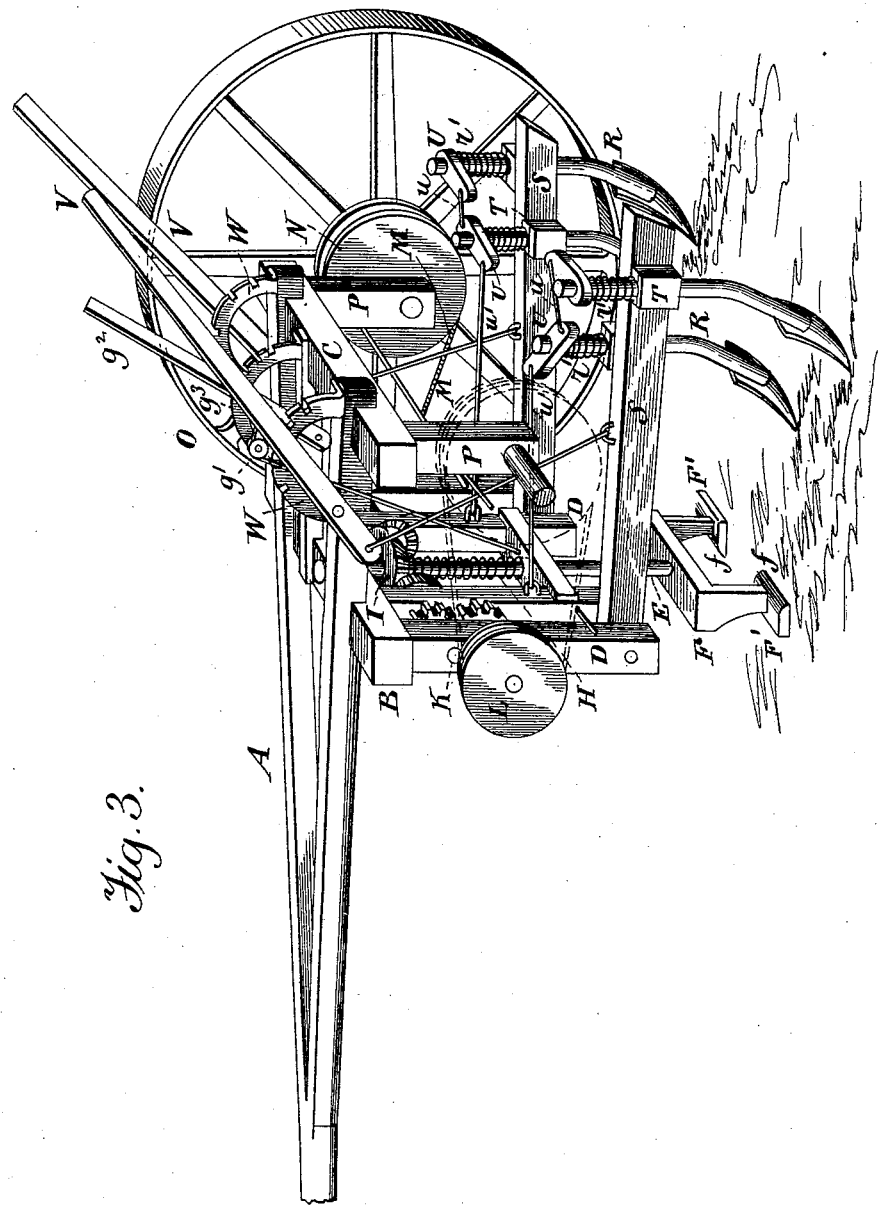

Figure 1 of the drawings is a vertical longitudinal section, and Fig. 2 a vertical cross-section. Fig. 3 is a perspective view.

In the drawings, A represents a V-shaped tongue or pole, which is fastened on the cross-beams B C. From the front beam B are suspended the hangers D D—a pair on each side of the rotary chopper-shaft E, which is in the middle. The shaft E carries at its lower end a cross-bar F, on whose ends are suspended the choppers F' F', made sharp on the working edge $f$, and is fast to a cross-slide G, grooved at each end to slide up and down on the two opposite hangers D D. This slide G and the shaft E are held down by the spiral spring H, and above the spring is placed a spur-wheel I, keyed to the shaft E, so that it will turn it. The wheel I is rotated by a pinion J on a shaft K, which is turned by a pinion K', and this by a pinion $K^2$ on a shaft $K^3$, which is turned by the pulley L, connected by an endless band M with a pulley N on the inside of the ground-wheel O. The latter is journaled on the bearing P, extended out horizontally from the vertical hanger Q, suspended from the cross-beam C.

R R are two cultivator-standards on each side of the chopper to work between the rows of the young cotton, their beam S being pivoted in front between hangers D D and provided on the sides with the guides T, through which pass the standards R until the shoulder $r$ strikes the guides.

U U are two upper guides, through which the standards move up and down and which are connected together by the end pivoted rod $u$ and to the inside hanger D by a pivoted rod $u'$. Between the guides T U is arranged a spiral spring $r'$, which holds down the standard, but yields to any obstruction, so that it may rise.

The beam S is connected with a lifting-lever V, which may be set in a ratchet W to hold the cultivator out of the ground. The cross-slide G is also connected by a cord, rope, or chain passing over a pulley $g'$, with a lever $g^2$, which can thus lift the chopper from the ground when necessary and hold it up by means of a ratchet $g^3$.

Each side of the chopper or cultivator is provided with a duplicate of the devices on the other, and their joint action makes all the parts work without jar.

Having thus described all that is necessary to a full understanding of my invention, what I claim as new, and desire to protect by Letters Patent, is—

1. The rotary choppers F' F', attached to a cross-bar F on a vertical rotary shaft E, in combination with the cross-slide G, made fast to said shaft, the spiral spring H, and a lever $g^2$, connected with said slide G, whereby the shaft and choppers are held down yieldingly to their work, but may be lifted when necessary, as set forth.

2. The combination, with the cultivator-standards, of the guides T U, the intermediate spiral springs, and the plow-beams, the upper guides being connected with each other and with a hanger D by rods, substantially as described.

3. The combination, with the chopper-shaft E, of the bevel spur-wheel I, keyed thereto, the beveled pinions J J on shafts K K, the pulleys L L N N, bands M M, and ground-wheels O O, as and for the purpose specified.

In testimony whereof I affix my signature in presence of two witnesses.

THOMAS H. SMITH.

Witnesses:
W. L. JONES,
R. T. SMITH.